Oct. 4, 1949.   M. L. BETTCHER   2,483,518
PLUG COCK VALVE
Filed Feb. 3, 1945
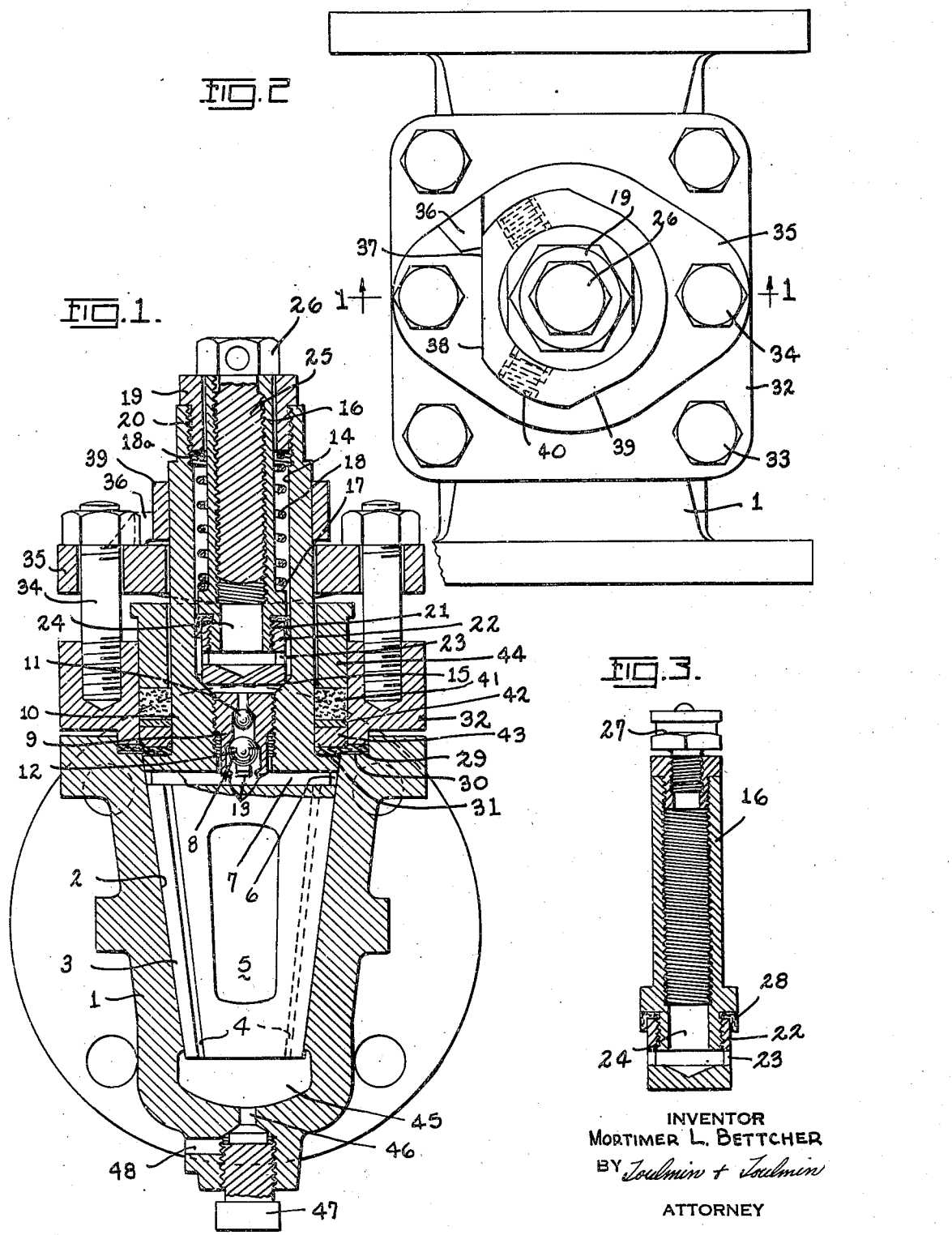
INVENTOR
MORTIMER L. BETTCHER
BY Toulmin & Toulmin
ATTORNEY Patented Oct. 4, 1949

2,483,518

UNITED STATES PATENT OFFICE 2,483,518

PLUG COCK VALVE

Mortimer L. Bettcher, Montgomery County, Ohio, assignor to The Duriron Company, Inc., Dayton, Ohio, a corporation of New York Application February 3, 1945, Serial No. 575,994

3 Claims. (Cl. 251—93)

My invention relates to plug cock valves.

The object of this invention is to provide a plug cock valve having mounted in the stem of the valve member thereof a composite, completely removable lubricant pressure cylinder; and in combination therewith a check valve mechanism located between the lubricant cylinder and the groove in the valve member whereby the lubricant cylinder can be removed, refilled and reinserted without leakage of the contents of the pipe line in which the valve is located.

It is another object to provide such a valve mechanism that it is readily operable for the discharge of lubricant therethrough into the valve member but will equally effectively prevent the exit of gases or fluids from the valve through and into the lubricant chamber.

It is another object to provide in association with the unitary removable lubricant chamber which is mounted in the valve stem of the rotor of the valve a removable discharge head which can be removed at will for loading and for cleaning of the lubricant discharge mechanism.

It is a further object to provide a lubricated valve in which all of the parts can be disassembled and cleaned.

It is a further object to provide in connection with the cleaning mechanism of the valve, a valve below the valve plug through which lubricant can be discharged under pressure from the lubricant supplying mechanism in the valve stem. In this way the valve can be cleaned out quickly with a minimum of shut down time, and a more thorough cleaning can be effected by a complete disassembly of the valve.

Referring to the drawings:

Figure 1 is a vertical section on the line 1—1 of Figure 2 looking in the direction of the arrows.

Figure 2 is a top plan view of the valve.

Figure 3 is a detailed view of a modification of the removable lubricant discharge cylinder.

Referring to the drawings in detail, 1 designates the valve body which has a tapered interior for receiving the plug 3. The plug 3 constituting the valve member is provided with a plurality of vertically disposed surface grooves 4 and an interior passageway 5. The grooves 4 communicate with the horizontally disposed grooves 6 that are in communication, by means of the passageway 7, with the check valve passageway 8. This passageway 8 is formed within the check valve sleeve 9 that is internally threaded into the valve stem 10. The passageway 8 is controlled by the small upper ball check valve 11 and the largest lower check valve 12. The lugs 13 support the lower ball check 12. In this manner there is provided a double ball check to prevent the escape of gases or liquids from the valve into the lubricant passageway hereinafter described.

The valve stem is provided with a vertical bore 14, the bottom of which is closed by the screw plug containing the check valve. The cylinder 14 is provided with tapered lower ends 15 which act as a support for the lower end of the hereinafter described removable lubricant cylinder. This lubricant cylinder, designated 16, is provided at its lower end with a shoulder 17 for receiving the pressure spring 18 that tends to force it downwardly. This spring engages at 18 with the bottom of the retaining screw plug 19 that is threaded at 20 into the upper end of the sleeve of the valve stem. The cylinder 16 may be arranged so as not to turn relative to the nut 19 by any suitable sliding key arrangement, if desired.

The lower end of the lubricant cylinder 16 is externally threaded at 21 to receive the nut 22 which has distribution ports 23. It is through these distribution ports 23 that the lubricant from the interior 24 of the cylinder 16 is discharged. The lubricant is forced down by the screw plug 25 which is provided with a head 26.

In the modification shown, in Figure 3, a grease gun fitting at 27 is provided to which an ordinary grease gun can be attached and the grease discharged into the passageway 17. By discharging the lubricant downwardly into the passageway 17 and through the port 23 the cylinder 16 is elevated and lubricant fills the entire interior of the valve stem below the sealing ring 28 which engages the interior of the valve stem and which is carried by the cylinder 16.

To disassemble, the plug 19 is unscrewed which enables the entire assembly of the cylinder 16, its lubricant discharge screw 25 and its distribution head 22 to be removed as a unit. It can then be reloaded and reassembled. After reinsertion within the valve stem, the screw 25 can be screwed down to discharge the lubricant to the passageway 23 into the interior of the valve stem which will force up the cylinder 16 against the spring 18. The pressure of the spring will tend continuously to discharge the lubricant as the lubricant is needed in the grooves of the valve.

The plug 3 is retained in position and sealed against the exit of any vapors or liquids in the following manner: sealing gasket 29 rests upon the shoulder 30 of the valve casing 1 and upon a shoulder 31 of the plug valve adjacent the base of the valve stem. This sealing washer or ring is retained in position by the retaining collar 32 which in turn is held in position by the bolts 33. The retaining collar carries the bolts 34 which hold in position the stop collar 35 which is provided with a stop 36 that engages the shoulders 37 and 38 of the ring 39 which is retained by the set screws 40 on the outside of the valve stem cylinder. In this way the rotation in either direction of the plug 3 is limited. There is a clearance between the retaining ring 32 and the wall of the valve stem which is filled by the ring 41, the washer 42, the sealing member 43 and the retaining collar 44.

A clean out of the valve can be effected without disassembling the valve by applying pressure to the lubricant as heretofore described and discharging the lubricant into the chamber 45. The chamber 45 has a discharge passageway 46 which is controlled by the screw plug 47 which also controls the discharge passageway or flush out hole 48. By taking away the plug 47, the lubricant can be discharged from the collecting chamber 45 through the passageways 46 and 48. This can be done while the valve is closed and the line is shut off by the rotation of the valve plug 3.

There are, therefore, three general conditions of operation of this valve: the first is the normal operation of the valve by which lubricant is automatically pressed into the groove as the grooves become empty. This is accomplished by the action of the spring 18 forcing the lubricant past the ball check valve into the groove; the second condition is where the lubricant chamber 16 is removed, with its associated parts and reloading takes place. During this period the valve can be operative as the double ball check prevents the escape of gases or liquids from the line controlled by the valve; and the third condition is where the operator desires to evacuate the used lubricant from the grooves in the surface of the plug valve and discharge the lubricant through the passageways 46 and 48 as just described. This latter operation can take place without shutting down the valve by disassembling it and with it turned to either on or off position.

It will be understood that I desire to comprehend within my invention such changes and adjustments as may be necessary to adapt the invention to various conditions and uses and to various types of construction and materials. I desire to comprehend within the scope of the hereinafter appended claims such necessary changes as may be necessary to adapt this invention to various conditions of use.

I claim:

1. In a plug cock valve, the combination of the valve casing, a rotatable plug having a hollow valve stem mounted therein, a detachable lubricant cylinder mounted within said valve stem, reciprocably yielding means for moving said cylinder downwardly in said valve stem, means movable in said cylinder to discharge lubricant therefrom into said valve stem to compress said yielding means, a dual check valve means for permitting the flow of lubricant from the interior of the valve stem to the surface of the plug in the casing of the valve but preventing the flow of liquids or gases from the valve into the valve stem.

2. In combination in the plug valve of a valve casing, a rotatable plug having lubricant grooves on the surface thereof and extending in straight longitudinal path therealong and opening into the bottom of the valve casing, a hollow valve stem integrally formed with said plug, check valve means detachably mounted in the bottom of said hollow valve stem comprising a dual ball check mechanism, a reciprocable lubricant carrying cylinder mounted within said valve stem and adapted to reciprocate therein, a piston in said cylinder, a distribution head on said cylinder, yielding means for yieldingly pressing said cylinder downwardly in said valve stem, and means adjustable within said cylinder for expelling lubricant therein into the space between said cylinder and the interior of said valve stem to compress said spring whereby said spring will tend yieldingly to evacuate lubricant from the interior of said valve stem through said valves into the longitudinal grooves of the plug of the valve.

3. In combination in the plug valve of a valve casing, a rotatable plug having lubricant grooves on the surface thereof and extending in straight longitudinal path therealong and opening into the bottom of the valve casing, a hollow valve stem integrally formed with said plug, check valve means detachably mounted in the bottom of said hollow valve stem comprising a dual ball check mechanism, a reciprocable lubricant carrying cylinder mounted within said valve stem and adapted to reciprocate therein, a piston in said cylinder, a distribution head on said cylinder, yielding means for yieldingly pressing said cylinder downwardly in said valve stem, screw threaded means adjustable within said cylinder for expelling the lubricant therein into the space between said piston and the bottom of said valve stem to compress said spring whereby said spring will tend yieldingly to evacuate lubricant from the interior of said valve stem through said valves into the longitudinal grooves of the plug of the valve, and means to close the casing of said valve and retain said plug in position and means supported thereby for limiting the rotation of said plug in either direction, said screw threaded means forming a head on the upper end of said cylinder, whereby a hammer blow thereon will build up a flash pressure on the lubricant in said valve.

MORTIMER L. BETTCHER.

REFERENCES CITED

The following references are of record in the file of this patent:

UNITED STATES PATENTS

| Number | Name | Date |
|---|---|---|
| 1,851,259 | Martin | Mar. 29, 1932 |
| 1,932,322 | Nordstrom | Oct. 24, 1933 |
| 1,940,378 | Sutliff | Dec. 19, 1933 |
| 1,998,029 | Simpson | Apr. 16, 1935 |
| 2,026,891 | Haun | Jan. 7, 1936 |
| 2,281,697 | Kerr | May 5, 1942 |
| 2,282,488 | MacClatchie | May 12, 1942 |

FOREIGN PATENTS

| Number | Country | Date |
|---|---|---|
| 256,098 | Great Britain | Aug. 5, 1926 |
| 330,044 | Great Britain | June 5, 1930 |
| 499,703 | Great Britain | Jan. 27, 1939 |